(No Model.)
A. C. MATHISON.
THILL COUPLING.
No. 491,782. Patented Feb. 14, 1893.
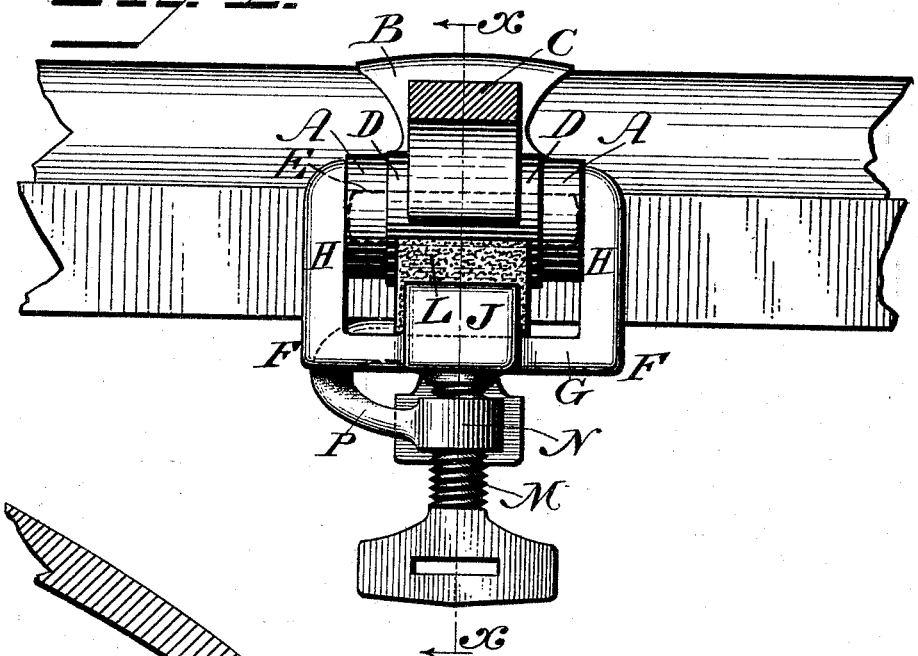
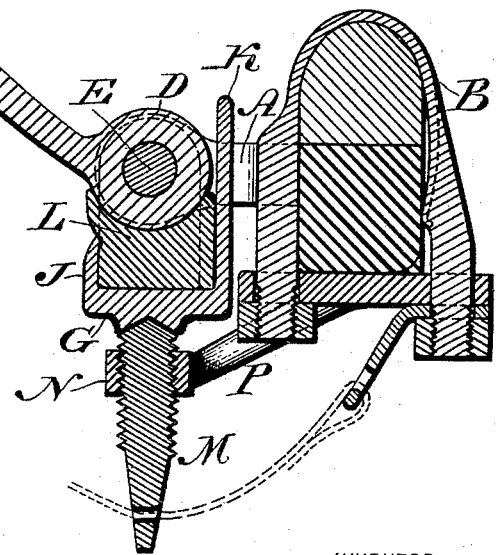
WITNESSES:
L. Douville,
P. F. Nagle.
INVENTOR
Albert C. Mathison.
BY
ATTORNEY.
THE NORRIS PETERS CO., PHOTO-LITHO., WASHINGTON, D. C.

UNITED STATES PATENT OFFICE.

ALBERT C. MATHISON, OF PHILADELPHIA, PENNSYLVANIA.

THILL-COUPLING.

SPECIFICATION forming part of Letters Patent No. 491,782, dated February 14, 1893.

Application filed October 26, 1892. Serial No. 450,016. (No model.)

*To all whom it may concern:*

Be it known that I, ALBERT C. MATHISON, a citizen of the United States, residing in the city and county of Philadelphia, State of Pennsylvania, have invented a new and useful Improvement in Thill-Couplings, which improvement is fully set forth in the following specification and accompanying drawings.

My invention consists of a thill coupling which is simple and effective, and not liable to rattle, as will be hereinafter fully set forth.

Figure 1 represents a front view of a thill coupling embodying my invention. Fig. 2 represents a longitudinal vertical section thereof, on line *x*, *x*, Fig. 1.

Similar letters of reference indicate corresponding parts in the two figures.

Referring to the drawings:—A designates ears which are connected with the axle by means of the clip B, and C designates a thill iron whose boss is D located between said ears and mounted on a pivotal pin E, whose ends are supported in said ears.

F designates a clevis which is formed of the base G, side pieces H, front piece J and rear piece K, said side, front and rear pieces rising from said base.

Between the front and rear pieces is a cushion or washer L, of soft rubber or other suitable elastic material, which is in contact with the boss D, from below, it being noticed that the piece K is between said boss and the clip B, and the side pieces H embrace the ears A and the ends of the pivotal pin E.

In order to sustain the clevis in position, I employ a screw M, which is fitted in a threaded eye N, the latter being sustained by an arm P which projects forwardly from the clip B, it being noticed that said screw occupies a vertical position and tightens against the base of the clevis, thus controlling the clevis and holding the cushion or washer L in contact with the boss D, and furthermore preventing rattling of the parts. Furthermore, the pivotal pin E is retained in position by the side pieces H of the clevis, thus avoiding the employment of a headed bolt and nut for such purpose. It will also be seen that when the screw is properly rotated, the clevis may be removed and the pin E withdrawn, whereby the boss is disconnected from the ears.

It is evident that the boss, pin and clevis may be restored to their normal positions, after which the screw is tightened against the clevis, thus again retaining the boss connected with the ears, it being noticed that the operations of separating and connecting the parts are accomplished in a simple and convenient manner, and the device is compact, inexpensive and durable in its nature.

Having thus described my invention, what I claim as new, and desire to secure by Letters Patent, is:—

1. In a thill coupling, ears adapted to be secured to an axle, a thill iron with boss, a pin pivoting said boss and ears, a clevis with a cushion in contact with said boss and a screw working in a threaded opening in an arm and controlling said clevis, said parts being combined substantially as described.

2. A clip having ears and a projecting arm, a thill iron with a boss mounted on said ears, a clevis with cushion in contact with said boss, and an adjusting screw fitted in the said arm and bearing against and controlling said clevis, said parts being combined substantially as described.

3. In a thill coupling, a clevis having a base, front side and rear parts forming a recess, a cushion seated in said recess, and an adjusting screw for said clevis, said parts being combined substantially as described.

4. A thill coupling consisting of ears, a boss mounted on said ears, an arm carrying a screw, and a clevis formed of a base, front, side and rear pieces, and a cushion seated on said base between the front and rear pieces, the side pieces inclosing the pivotal pin of said boss, the parts named being combined substantially as described.

ALBERT C. MATHISON.

Witnesses:
JOHN A. WIEDERSHEIM,
A. P. JENNINGS.